US012811845B2

(12) United States Patent
Soin et al.

(10) Patent No.: US 12,811,845 B2
(45) Date of Patent: Nov. 24, 2026

(54) CONTROL OF FAIL-TO-WIRE BYPASS FUNCTIONALITY FOR HIGH AVAILABILITY

(71) Applicant: Arista Networks, Inc., Santa Clara, CA (US)

(72) Inventors: Tarun K Soin, Fremont, CA (US); Venkitraman Kasiviswanathan, San Ramon, CA (US); Aparna Karanjkar, Cupertino, CA (US); Abhishek Gupta, Nashua, NH (US); Xiangyi Guo, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 232 days.

(21) Appl. No.: 18/620,183

(22) Filed: Mar. 28, 2024

(65) Prior Publication Data

US 2025/0310180 A1 Oct. 2, 2025

(51) Int. Cl.
*H04L 41/0663* (2022.01)
*H04L 41/0668* (2022.01)

(52) U.S. Cl.
CPC ...... *H04L 41/0663* (2013.01); *H04L 41/0668* (2013.01)

(58) Field of Classification Search
None
See application file for complete search history.

(56) References Cited

U.S. PATENT DOCUMENTS

| | | | | |
|---|---|---|---|---|
| 11,792,099 B2 * | 10/2023 | Zha | H04L 41/0663 709/224 |
| 2008/0310298 A1 * | 12/2008 | Drange | G01V 1/201 370/217 |
| 2018/0139113 A1 * | 5/2018 | Jhu | H04L 12/437 |
| 2019/0097947 A1 * | 3/2019 | Sufleta | H04L 49/25 |
| 2020/0076726 A1 * | 3/2020 | Seth | H04L 41/0663 |

* cited by examiner

*Primary Examiner* — Mohamed Ibrahim
(74) *Attorney, Agent, or Firm* — Treyz Law Group, P.C.; Tianyi He

(57) ABSTRACT

A network device may have a fail-to-wire functionality. The network device may obtain device operational state information while the network device is in operation and may selectively enable one or more (fail-to-wire) bypass paths coupled to a peer network device based on the obtained device operational state information. If desired, the network device may be configured to perform certain operations while the one or more bypass paths are enabled.

20 Claims, 7 Drawing Sheets

CONTROL OF FAIL-TO-WIRE BYPASS FUNCTIONALITY FOR HIGH AVAILABILITY

BACKGROUND

A networking system includes multiple network devices that are interconnected to form a network for conveying network traffic between host devices. In an illustrative network configuration, a network device may have a fail-to-wire functionality that enables a peer network device to use interfaces of the network device when the network device is powered off.

DETAILED DESCRIPTION

A network can convey network traffic (e.g., in the form of packets, frames, etc.) between host devices or generally between devices in the network. To properly route and forward the network traffic, the network can include a number of network devices. In one illustrative network configuration described herein as an example, a network device and a peer network device may be coupled between service provider network(s) and local area network(s).

The network device may include a fail-to-wire functionality based on which one or more interfaces of the network device may be accessible by the peer network device via corresponding fail-to-wire bypass paths when the network device is in a non-operational state (e.g., is shut down, is power cycling, etc.).

To further enhance the functionality of the network device, it may be desirable to expand on the fail-to-wire functionality of the network device. In particular, control circuitry of the network device may obtain information on the operational state of the network device and may selectively make use of the (fail-to-wire) bypass path (e.g., by activating a relay coupled along the bypass path) based on the operational state information of the network device. As an example, when one or more configurable criteria based on the operational state information are met, the control circuitry may activate the bypass path(s) (e.g., the relay(s) thereon) to enable the peer network device to handle traffic being conveyed through corresponding interface(s) of the network device. In such a manner, the operational reliability of the network device can be improved as the network device may provide high availability and redundancy in the event of operational state faults using the bypass path(s) coupled to the peer network device.

Figure 1:
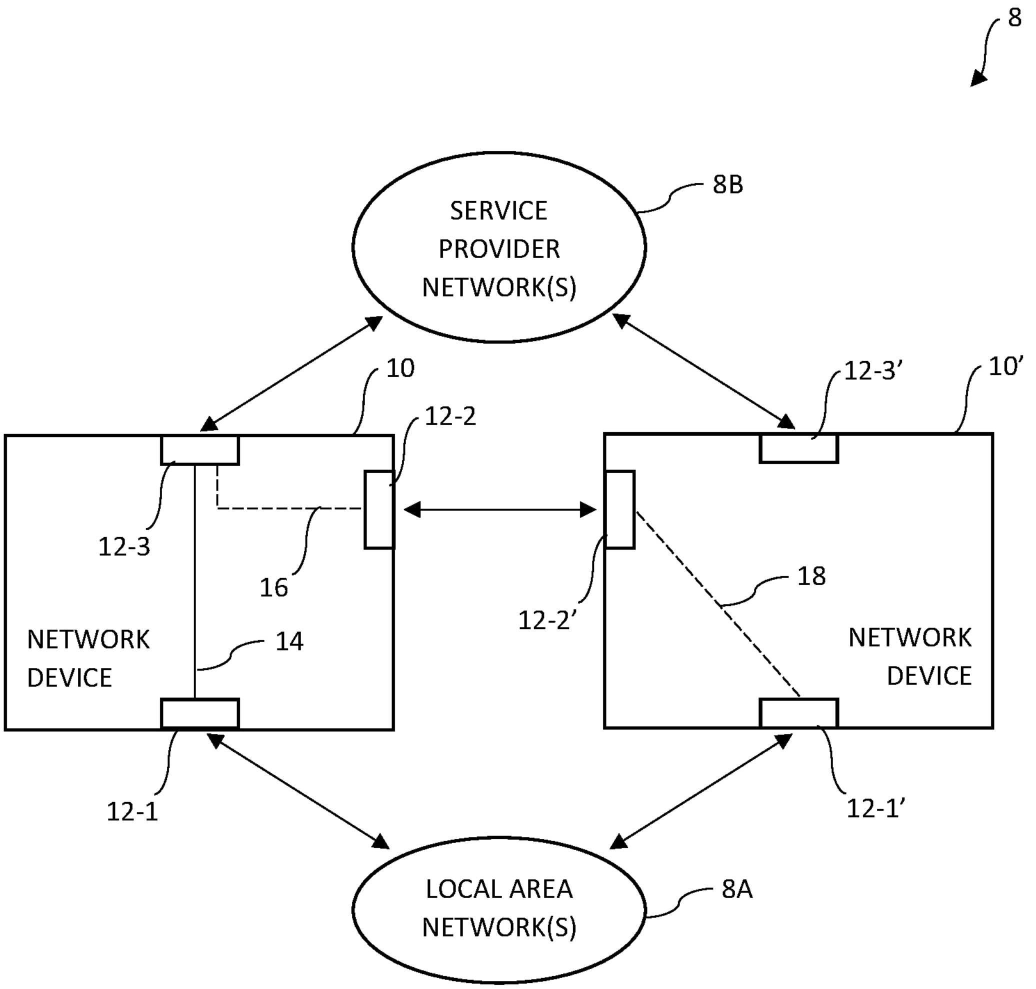
FIG. 1 is a diagram of an illustrative network having a network device with a fail-to-wire functionality and coupled to a peer network device in accordance with some embodiments.

FIG. 1 is a diagram of an illustrative networking system in which one or more network devices have bypass capabilities using fail-to-wire (e.g., that activate bypass path(s) based on the device operational state information as described above). The networking system may include one or more components of a network such as network 8. Network 8 may have any suitable scope. As examples, network 8 may include, be, and/or form part of one or more local segments, one or more local subnets, one or more local area networks (LANs), one or more campus area networks, a wide area network, etc. In particular, network 8 may be a wired network based on wired technologies or standards such as Ethernet (e.g., using copper cables and/or fiber optic cables) and may optionally include a wireless network such as a wireless local area network (WLAN). If desired, network 8 may include internet service provider networks (e.g., the Internet) or other public service provider networks, private service provider networks (e.g., multiprotocol label switching (MPLS) networks), and/or any other types of networks such as telecommunication service provider networks.

Network 8 can include networking equipment forming a variety of network devices that interconnect and convey network traffic between end hosts (e.g., host devices) of network 8. These network devices such as network devices 10 and 10' may each be a switch (e.g., a multi-layer (Layer 2 and Layer 3) switch or a single-layer (Layer 2) switch), a bridge, a router, a gateway, a hub, a repeater, a firewall, a wireless access point, a network device serving other networking functions, management equipment that manages and controls the operation of one or more of these network devices, or a network device that include the functionality of two or more of these devices.

End hosts devices of network 8 (e.g., of local area networks interconnected by a wide area network) may include computers, servers, portable electronic devices such as cellular telephones and laptops, other types of specialized or general-purpose host computing equipment (e.g., running one or more client-side and/or server-side applications), network-connected appliances or devices that serve as input-output devices and/or computing devices in a distributed networking system, devices used by network administrators (sometimes referred to as administrator devices), network service or analysis devices, and/or management equipment that manages and controls the operation of one or more of other end hosts and/or network devices.

In some illustrative configurations described herein as an example, network 8 may include one or more local area networks 8A and may include one or more service provider networks 8B (e.g., internet or other public service provider networks, private surface provider networks such as MPLS networks, etc.) communicatively coupling some local area networks (such as networks 8A) to other local area networks therethrough. Configured in this manner, network 8 may form a wide area network (WAN) that includes and uses one or more service provider networks 8B to interconnect multiple local area networks.

In the example of FIG. 1, network 8 may include a first network device 10 coupling one or more local area networks 8A to one or more service provider networks 8B. Network 8 may also include a second network device 10' coupling one or more local area networks 8A (e.g., the same local area network(s) or a different set of local area networks than those coupled to device 10) to one or more service provider networks 8B (e.g., the same service provider network(s) or a different set of service provider networks than those coupled to device 10). Configured in this manner, network devices 10 and 10' may be routers (e.g., WAN edge routers in the WAN context), multi-layer switches, or other suitable types of network devices in network 8.

Network device 10' may be a peer network device to network device 10 and may be communicatively coupled to network device 10 in certain modes of operation. In particular, network device 10 may include a plurality of network interfaces (sometimes referred to herein as input-output interfaces) such as network interfaces 12-1, 12-2, and 12-3 (e.g., Ethernet interfaces). When conveying network traffic between a local area network 8A and a service provider network 8B (and ultimately, to and from another (remote) local area network), network device 10 may use network interfaces 12-1 and 12-3 to transmit and receive the network traffic and may use one or more internal data plane processing paths 14 (e.g., that includes interface circuitry, software and/or hardware data plane processing circuitry, and other circuitry in device 10 forming each processing path 14) to process the transmitted and/or received traffic.

Network device 10 may further include a fail-to-wire functionality and may couple interface 12-2 implementing a fail-to-wire interface (sometimes described herein a bypass interface) to interface 12-3 (sometimes referred to herein as a WAN interface, e.g., because it provides connectivity to remote network portions through the WAN). In some instances, interface 12-2 may generally be a peer interface that facilitates connection (e.g., a direct wired connection) to a peer network device. Interfaces 12-2 and 12-3 may be coupled via a fail-to-wire path 16 (sometimes referred to herein as a fail-to-wire bypass path or a bypass path).

Peer network device 10' may include a plurality of network interfaces such as network interfaces 12-1', 12-2', and 12-3' (e.g., Ethernet interfaces). Peer network device 10' may similarly use network interfaces 12-1' and 12-3' (and an internal data plane processing path therebetween) to convey traffic between local area network 8A and service provider network 8B. Interface 12-2 of network device 10 may be directly connected (e.g., via a wired cable connection and/or without an intervening network device) to corresponding interface 12-2' of peer network device 10'. Network device 10' may use network interface 12-2' to receive traffic from and/or transmit traffic to interface 12-3 through interface 12-2 and bypass path 16 (when active). In other words, as an alternative to internal processing paths 14 and interface 12-1 of device 10 handling traffic through interface 12-3, bypass path 16, interface 12-2, a communication link between interfaces 12-2 and 12-2' (e.g., a wired Ethernet link), an internal data plane processing path 18 of peer network device 10', and interface 12-1' may serve as an additional path for processing traffic conveyed through interface 12-3.

In particular, in scenarios in which network device 10 is operational (e.g., as shown in FIG. 1), network device 10 may use internal processing path 14 to processing network traffic conveyed through interface 12-3 while disabling (e.g., deactivating) fail-to-wire bypass path 16 and fail-to-wire interface 12-2 such that the network traffic is processed locally and not passed to and/or from network device 10' using interface 12-2 and the communication link to interface 12-2'. When network device 10 has a fail-to-wire functionality, in scenarios in which network device 10 is non-operational (e.g., is powered down expectedly or unexpected, is power cycling or restarting, etc.), bypass path 16 may be enabled (e.g., activated) to convey traffic (for interface 12-3) to and from network device 10' and rely on data plane processing of network device 10' (e.g., implementing processing path 18) instead of data plane processing of network device 10 (thereby bypassing circuitry implementing processing path 16).

Figure 2:
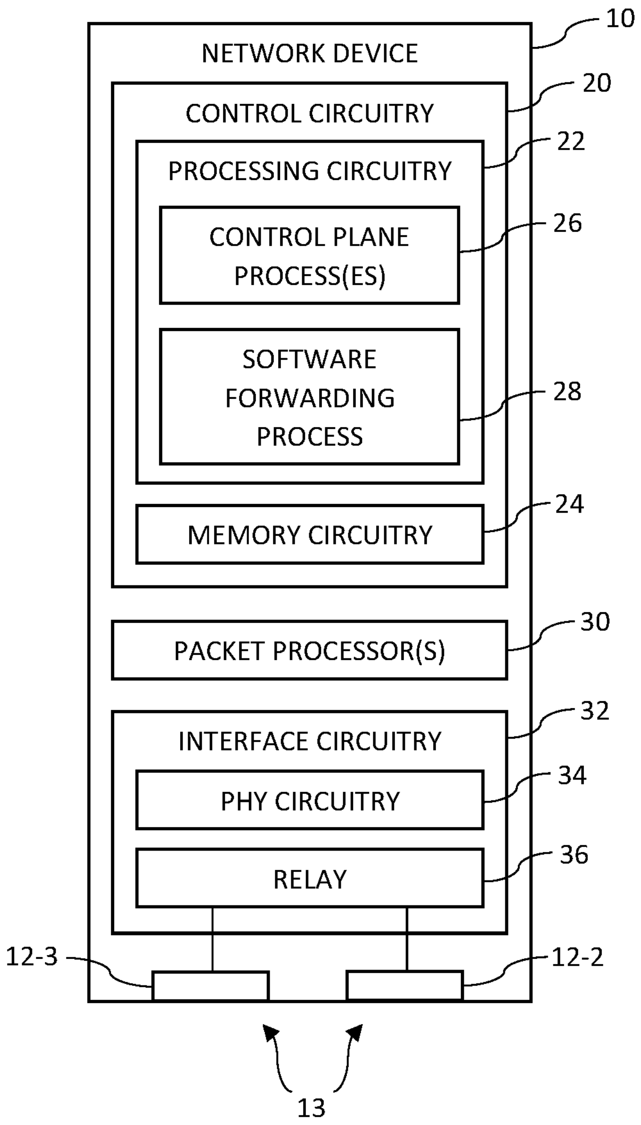
FIG. 2 is a diagram of an illustrative network device in accordance with some embodiments.

FIG. 2 is a diagram of an illustrative network device used to implement network device 10 in FIG. 1 (and/or other network devices in network 8 such as device 10' in FIG. 1). Configurations in which the network device of FIG. 2 implements network device 10 in FIG. 1 are shown and described herein as an illustrative example.

As shown in FIG. 2, network device 10 may include control circuitry 20 having processing circuitry 22 and memory circuitry 24, one or more packet processors 30, and input-output or network interfaces 12 (e.g., interfaces 12-1, 12-2, 12-3, etc.) each formed from one or more ports 13 as configured by interface circuitry 32. In one illustrative arrangement, network device 10 may be or form part of a modular network device system (e.g., a modular switch system having removably coupled modules usable to flexibly expand characteristics and capabilities of the modular switch system such as to increase ports, provide specialized functionalities, etc.). In another illustrative arrangement, network device 10 may be a fixed-configuration network device (e.g., a fixed-configuration switch having a fixed number of ports and/or a fixed hardware configuration).

Processing circuitry 22 of network device 10 may include one or more processors such as central processing units (CPUs), graphics processing units (GPUs), microprocessors, general-purpose processors, host processors, microcontrollers, digital signal processors, programmable logic devices such as field programmable gate array (FPGA) devices, application specific system processors (ASSPs), application specific integrated circuit (ASIC) processors, and/or other types of processors.

Processing circuitry 22 may run (e.g., execute) a network device operating system and/or other software/firmware that is stored on memory circuitry 24 communicatively coupled to and accessible by processing circuitry 22. Memory circuitry 24 may include one or more non-transitory (tangible) computer-readable storage media that store the operating system software and/or any other software code, sometimes referred to as program instructions, software, data, instructions, or code. In particular, memory circuitry 24 may include non-volatile memory (e.g., flash memory, electrically-programmable read-only memory, a solid-state drive, hard disk drive storage, etc.), volatile memory (e.g., static or dynamic random-access memory), removable storage devices (e.g., storage devices removably coupled to device 10), and/or other types of memory circuitry.

As examples, the control plane and/or data plane (software forwarding) operations described herein and performed by network device 10 may be stored as (software) instructions on the one or more non-transitory computer-readable storage media (e.g., in portion(s) of memory circuitry 24). The corresponding processing circuitry (e.g., one or more processors of processing circuitry 22) may process (e.g., execute) the respective instructions to perform the control plane and/or data plane operations.

Processing circuitry 22 and memory circuitry 24 as described above may sometimes be referred to collectively as control circuitry 20 (e.g., implementing a control plane of network device 10, among other functions). Accordingly, processing circuitry 22 may also sometimes be referred to as control plane processing circuitry 22. As just a few examples, processing circuitry 22 may execute network device control plane software such as operating system software, routing policy management software, routing protocol agents or processes, routing information base agents or processes, and other control plane software, may be used to support the operation of protocol clients and/or servers (e.g., to form some or all of a communications protocol stack such as an Internet Protocol (IP) and Transmission Control Protocol (TCP) stack), may be used to support the operation of packet processor(s) 30, may store packet forwarding information, may execute packet processing software, and/or may execute other software instructions that control the functions of network device 10 and the other components therein.

Configurations in which processing circuitry 22 executes one or more control plane processes 26 (e.g., routing policy management processes, routing protocol processes, routing information base processes, etc.) and a software forwarding process 28 or other packet processing software containing corresponding instructions stored on memory circuitry 24 are sometimes described herein as an illustrative example.

Packet processor(s) 30 may be used to implement a data plane or forwarding plane of network device 10 and may therefore sometimes be referred to herein as data plane processor(s) 30 or data plane processing circuitry 30. Packet processor(s) 30 may include one or more processors such as programmable logic devices (e.g., field programmable gate array (FPGA) devices), application specific system processors (ASSPs), application specific integrated circuit (ASIC) processors, central processing units (CPUs), graphics processing units (GPUs), microprocessors, general-purpose processors, host processors, microcontrollers, digital signal processors, and/or other types of processors.

A packet processor 30 may receive incoming (ingress) network traffic via network interfaces 12 implemented on ports 13 (and/or internal interfaces), parse and analyze the received network traffic, process the network traffic based on packet forwarding decision data (e.g., in a forwarding information base) and/or in accordance with network protocol(s) or other forwarding policy, and forward (or drop) the network traffic accordingly (e.g., forward to another network interface 12 for egress). The packet forwarding decision data may be stored on memory circuitry integrated as part of and/or separate from packet processor 30 (e.g., on content-addressable memory), and/or on a portion of memory circuitry 24. Memory circuitry for packet processor 30 may similarly include volatile memory and/or non-volatile memory.

If desired and configured, processing circuitry 22, executing software forwarding process 28, may perform at least some of the traffic processing operations described above in connection with packet processor 30. As an example, traffic received by packet processor 30 may be provided to processing circuitry 22 and processed using software forwarding process 28 before being egressed at an interface 12 (or dropped). Accordingly, processing circuitry 22 and/or packet processor 30 may be used to implement data plane processing path 14 (FIG. 1).

Network device 10 may include interface circuitry 32 configured to form network interfaces 12 using ports 13 (e.g., by configuring physical lanes on port connectors of ports 13). In particular, interface circuitry 32 may include physical layer circuitry 34 (sometimes referred to herein as PHY circuitry 34), among other lower layer circuitry such as data link layer circuitry (e.g., a medium access control (MAC) sublayer). As an example, interface circuitry 32 may be implemented using one or more integrated circuits mounted to a printed circuit substrate and/or provided as part of a network interface controller, and/or using other types of network interface circuitry. Physical layer circuitry 34 may be formed from one of these integrated circuits that implements physical layer functions (e.g., as specified by the Open Systems Interconnection (OSI) model). Configurations in which physical layer circuitry 34 implements a physical layer portion of the Ethernet standard are sometimes described herein as an illustrative example.

Accordingly, interface circuitry 32 may configure ports 13 to provide network (e.g., Ethernet) interfaces 12 through which communication links with external equipment can be established. As examples, (fail-to-wire) interface 12-2 may couple interface circuitry 32 to peer network device 10' (FIG. 1) to establish a communication link therebetween, (WAN) interface 12-3 may couple interface circuitry 32 to a service provider network 8B to establish a communication link therebetween, and (LAN) interface 12-1 (FIG. 1) may couple interface circuitry 32 to a local area network 8A (e.g., network device(s) therein) to establish a communication link therebetween.

In some instances, ports 13 may be configured to directly receive electrical or optical cables used as the physical transmission media for communication links. In other instances, ports 13 may receive intervening module(s) (e.g., various types of small form-factor pluggable modules or generally removable transceiver modules) through which electrical or optical cables used as the physical transmission media for the communication link are received. In general, ports 13 may be physically coupled and electrically connected to corresponding mating connectors of external equipment, when received at the ports, and may have different form-factors to accommodate different cables, different modules, different devices, or generally different external equipment.

To provide a fail-to-wire functionality, interface circuitry 32 of network device 10 may include one or more (fail-to-wire) relays (sometimes referred to herein as relay switches or switches) such as relay 36. Relay 36 may be coupled along path 16 in FIG. 1 and between interfaces 12-2 and 12-3. Other relays may be coupled along corresponding bypass paths each between a (WAN) interface and a (fail-to-wire) interface.

Figure 3:
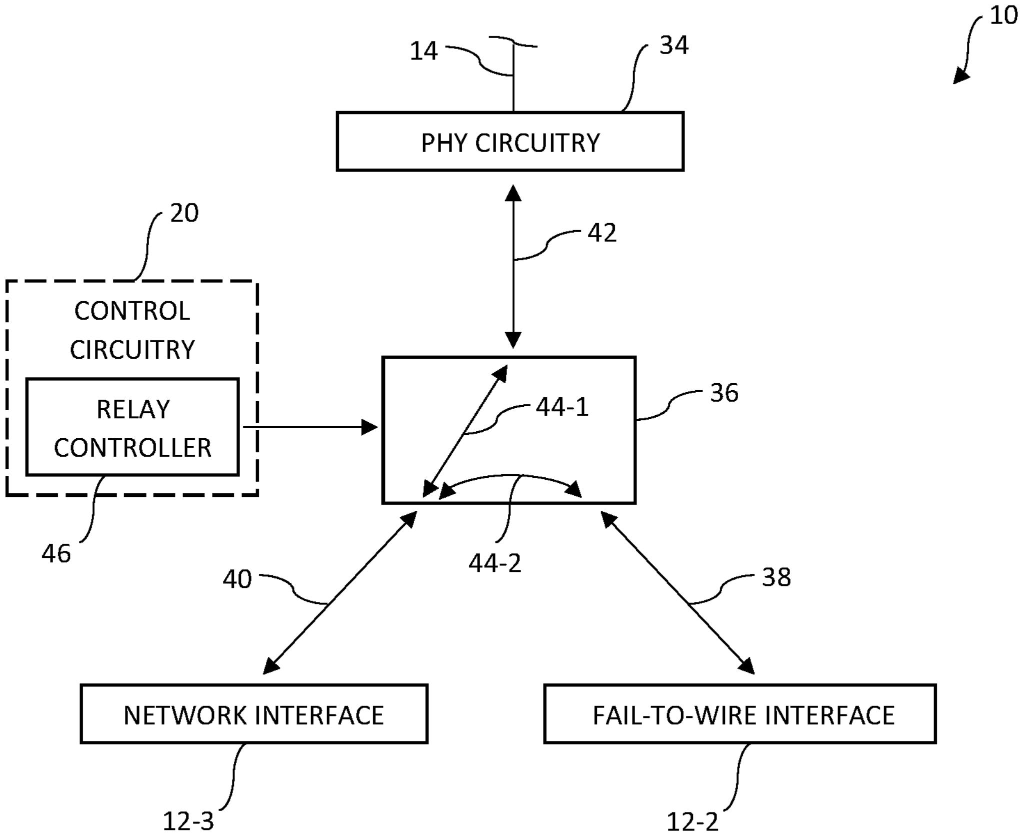
FIG. 3 is a diagram of an illustrative bypass path relay configured to switch between different states in accordance with some embodiments.

FIG. 3 is a diagram of an illustrative implementation of a relay such as fail-to-wire relay 36. Relay 36 may be controlled to exhibit first and second states. In a first (disabled or deactivated) state indicated by arrow 44-1, relay 36 may connect paths 40 and 42 and may communicatively couple network interface 12-3 to physical layer circuitry 34 (and onward to other parts of local processing paths 14 in network device 10). In a second (enabled or activated) state indicated by arrow 44-2, relay 36 may connect paths 38 and 40 and may communicatively couple network interface 12-3 to fail-to-wire interface 12-2 (and onward to peer network device 10' and the data processing paths 18 therein).

In other words, in scenarios in which an internal data plane processing path such as path 14 (FIG. 1) is actively used to locally process network traffic, e.g., to and from interface 12-3 in FIG. 1, relay 36 may decouple interface 12-2 from interface 12-3 and/or may couple interface 12-3 to path 14 (e.g., to physical layer circuitry 34, packet processors 30, processing circuitry 22 implementing software forwarding process 28, etc.). In this disabled state, path 38 and interface 12-2 may be disconnected from the two other terminals of switch 36 and fail-to-wire bypass path 16 (FIG. 1) may disabled. In scenarios in which the use of peer device data plane processing using path 18 is desired, relay 36 may decouple path 14 (e.g., physical layer circuitry 34, packet processors 30, processing circuitry 22 implementing software forwarding process 28, etc.) from interface 12-3 and couple interface 12-3 to interface 12-2. In this enabled state, path 42 and physical layer circuitry 34 may be disconnected from the two other terminals of switch 36 and fail-to-wire bypass path 16 (FIG. 1) may be enabled.

A fail-to-wire functionality, and consequently, bypass path 16 are typically activated to bypass network device 10 when network device 10 is powered down (e.g., during a restart or power cycle) due to an unexpected fault or intentionally. To further enhance operation of network device 10, control circuitry 20 (FIG. 2) may be configured to make use of the fail-to-wire functionality and selectively enable bypass path 16 in response to one or more configurable criteria, based on operating information of network device 10, being met. This enhancement leverages the use of bypass path 16 to improve device reliability (e.g., to provide high availability and redundancy) in scenarios in which network device 10 is not fully non-operational (e.g., is powered on and at least partly operational).

Accordingly, network device 10 may include a relay controller 46 configured to provide one or more control signals to switch relay 36 between first and second states (e.g., to place relay 36 in the disabled state at a given time and to place relay 36 in the enabled state at another time). In configurations sometimes described herein as an example, relay controller 46 may be implemented using control circuitry 20 (e.g., implemented as a software driver for relay 36 executed by control circuitry 20). If desired, relay controller 46 may be implemented separately from control circuitry 20 (e.g., as a dedicated hardware controller, as an integrated circuit, etc.) and/or may receive data or other signals from control circuitry 20 based on which relay controller 46 controls (e.g., provide control signals to) relay 36.

While, in some illustrative configurations described herein, a relay controller such as relay controller 46 is used to control the state of relay(s) to enable and disable (fail-to-wire) bypass path(s), this is merely illustrative. If desired, controller 46 may generally be a controller that enables and disables (fail-to-wire) bypass paths by controlling the state of other elements, instead of or in addition to the relay(s). Accordingly, controller 46 may sometimes be referred to herein as a bypass path controller or a fail-to-wire path controller.

Control circuitry 20 and/or controller 46 may use numerous types of device operating information (sometimes referred to herein as device operational state information) to determine whether or not one or more criteria (e.g., one or more criteria predictive or generally indicative of a fault or other event based on the operation of device 10) are met. Responsive to these one or more criteria being met, controller 46 may output one or more control signals to enable one or more corresponding bypass paths (e.g., by switching appropriate relays 36 and/or other elements to states that enable the bypass paths).

Figure 4:
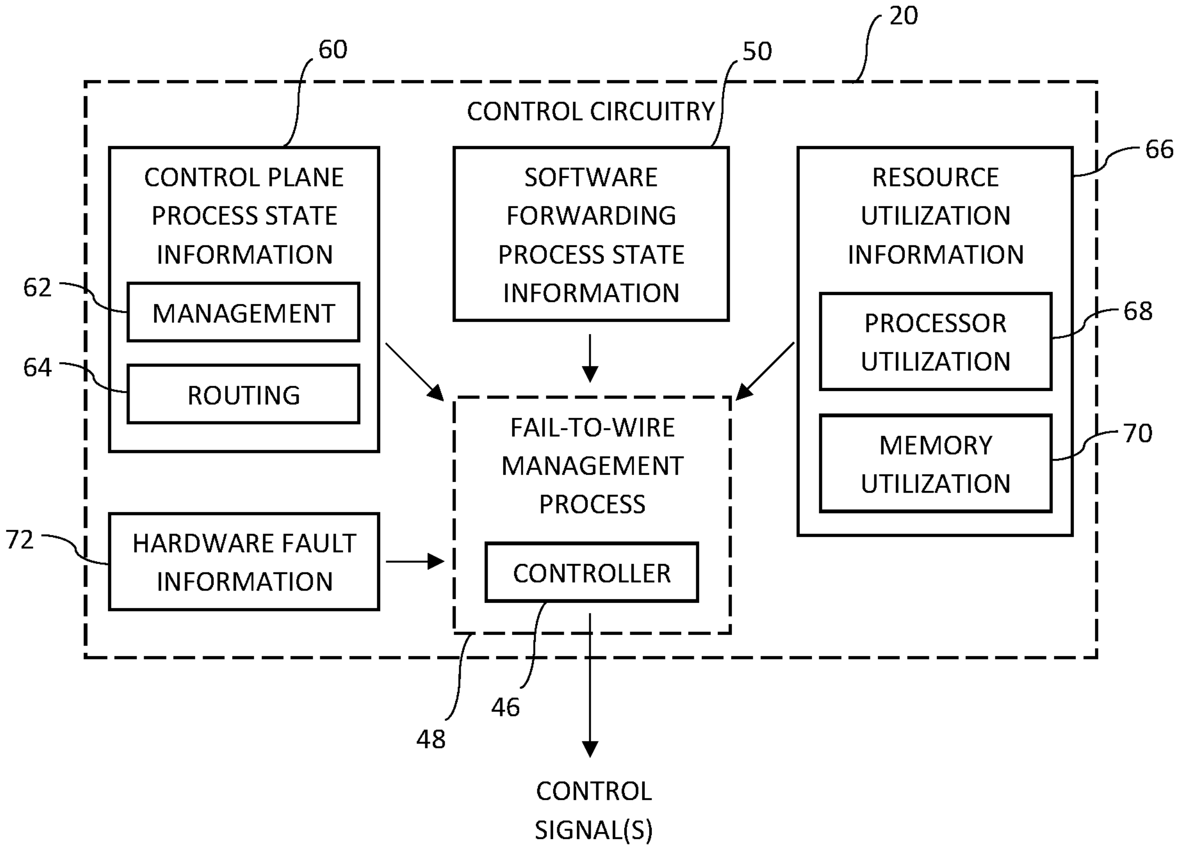
FIG. 4 is a diagram of illustrative device operational state information based on which the bypass path can be controlled in accordance with some embodiments.

FIG. 4 is a diagram of illustrative device operational state information obtained by control circuitry 20 (e.g., on memory circuitry 24) and usable to selectively enable bypass paths. In some illustrative examples described herein, control circuitry 20 (e.g., processing circuitry 22 executing software instructions stored on memory circuitry 24) may execute a (fail-to-wire) management process 48 that determines when one or more criteria (e.g., indicative of fault(s)) have been met. In response to determining that the one or more criteria have been met, control circuitry 20 (e.g., executing management process 48) may cause (e.g., control or instruct) controller 46 to enable relay 36 or otherwise enable bypass path 16 (FIG. 1).

Control circuitry (e.g., executing management process 48) may also determine when one or more other criteria (e.g., indicative of no fault) has been met. In response to determining that the one or more other criteria have been met, control circuitry 20 (e.g., executing management processor 48 may cause (e.g., control or instruct) controller 46 to disable relay 36 or otherwise disable bypass path 16 (FIG. 1). Controller 46 may be implemented as part of management process 48 or may receive control signals or other control data from management process 48 (executed by control circuitry 20).

These one or more above-mentioned criteria and other criteria may be based on device operational state information (e.g., information measured or otherwise obtained as network device 10 is operating). As examples, the device operational state information may include software forwarding process state information 50, control plane processing state information 60, resource utilization information 66, hardware fault information 72, and/or other types of device operating information.

In some illustrative configurations, control circuitry 20 (e.g., executing management process 48) may obtain, store, and/or use (e.g., process) software forwarding process state information 50 (e.g., indicative of a fault or generally an undesired operational state of software forwarding process 28 in FIG. 2 executed on control circuitry 20) to determine whether or not a criterion to enable relay 36 and enable bypass path 16 is met and/or to determine whether or not a criterion to disable relay 36 and disable bypass path 16 is met.

As examples, the criterion to enable relay 36 and enable bypass path 16 may be met when software forwarding process 28 is down or non-operational (e.g., is not initiated when device 10 is powered on), when software forwarding process 28 continuously restarts (e.g., restarts a number of times greater than a threshold number of times over a time period), or when software forwarding process 28 otherwise exhibits an unstable or non-operational state. The criterion to disable relay 36 and disable bypass path 16 may be met when software forwarding process 28 is up and operational for a period of time greater than a threshold period of time.

In some illustrative configurations, control circuitry 20 (e.g., executing management process 48) may obtain, store, and/or use (e.g., process) control plane process state information 60 (e.g., indicative of a fault or generally an undesired operational state of one or more device management processes 62 executing on control circuitry 20, indicative of a fault or generally an undesired operational state of one or more (routing) protocol processes 64 executing on control circuitry 20, and/or indicative of a fault or generally an undesired operational state of one or more other control plane processes 26 in FIG. 2 executing on control circuitry 20) to determine whether or not a criterion to enable relay 36 and enable bypass path 16 is met and/or to determine whether or not a criterion to disable relay 36 and disable bypass path 16 is met.

As examples, the criterion to enable relay 36 and enable bypass path 16 may be met when one or more control plane processes 26 are down or non-operational (e.g., are not initiated when device 10 is powered on), when one or more control plane processes 26 continuously restart (e.g., restart a number of times greater than a threshold number of times over a time period), and/or when one or more control plane processes 26 otherwise exhibits an unstable or non-operational state. The criterion to disable relay 36 and disable bypass path 16 may be met when the one or more control plane processes 26 is up and operational for a period of time greater than a threshold period of time.

In some illustrative configurations, control circuitry 20 (e.g., executing management process 48) may obtain, store, and/or use (e.g., process) resource utilization information 66 (e.g., indicative of a fault or generally an undesired operational state associated with control circuitry processor utilization 68, indicative of a fault or generally an undesired operational state associated with control circuitry memory utilization 70, and/or indicating a fault or generally an undesired operational state associated with other device resource utilization metrics such packet processor utilization, packet processor memory utilization, etc.) to determine whether or not a criterion to enable relay 36 and enable bypass path 16 is met and/or to determine whether or not a criterion to disable relay 36 and disable bypass path 16 is met.

As examples, the criterion to enable relay 36 and enable bypass path 16 may be met when processor utilization 68 for one or more specific processes (e.g., for one or more processes 26 and/or for process 28 in FIG. 2) exceeds (e.g., is above) a processor utilization threshold, when memory utilization 70 for one or more specific processes (e.g., for one or more processes 26 and/or for process 28 in FIG. 2) exceeds (e.g., is above) a memory utilization threshold, and/or when other metrics on resource utilization exhibit an over-utilization state. The criterion to disable relay 36 and disable bypass path 16 may be met when processor utilization 68 for the one or more specific processes (e.g., for one or more processes 26 and/or for process 28 in FIG. 2) exceeds (e.g., is below) the same processor utilization threshold or a different (lower) processor utilization threshold for a period of time, when memory utilization 70 for one or more specific processes (e.g., for one or more processes 26 and/or for process 28 in FIG. 2) exceeds (e.g., is below) the same memory utilization threshold or a different (lower) processor memory threshold for a period of time, and/or when other metrics on resource utilization exhibit a satisfactory or under-utilization state for a period of time.

In some illustrative configurations, control circuitry 20 (e.g., executing management process 48) may obtain, store, and/or use (e.g., process) on-device hardware fault information 72 (e.g., fault(s) indicated by state information of a cryptographic engine, fault(s) indicated by state information of a memory controller or error checking circuitry, fault(s) indicated by state information of a thermal management system including one or more temperature sensors, etc.) to determine whether or not a criterion to enable relay 36 and enable bypass path 16 is met and/or to determine whether or not a criterion to disable relay 36 and disable bypass path 16 is met.

As examples, the criterion to enable relay 36 and enable bypass path 16 may be met when control circuitry 20 obtains an indication of fault (e.g., a cryptographic engine failure) from the cryptographic engine or other sources, when control circuitry 20 obtains an indication of fault (e.g., a number of memory errors exceeding a threshold number over a period of time) from the memory controller and/or error checking circuitry or other sources, when controller circuitry 20 obtains an indication of fault (e.g., a component temperature exceeding a threshold temperature, a flag indicative of a thermal issue, etc.) from the thermal management system and/or temperature sensor(s) or other sources, and/or when control circuitry 20 receives other indications of fault at hardware components (e.g., within device 10 but external to control circuitry 20). The criterion to disable relay 36 and disable bypass path 16 may be met when control circuitry 20 stops receiving these indications of fault (e.g., for a period of time).

These examples of device operational state information described above in connection with FIG. 4 are merely illustrative. Other information may be used in addition to or instead of the above-mentioned device operational state information. The examples of criteria for enabling and disabling bypass path 16 based on different types of device operational state information are merely illustrative. The criteria for enabling and disabling bypass path 16 as described in the above-mentioned illustrative configurations may be used in combination or separately.

In general, control circuitry 20 (e.g., executing management process 48) may obtain fixed or dynamic (adjustable) threshold values and use the comparisons of obtained device operational state information (e.g., metrics) to these threshold values to determine whether a criterion (e.g., a fault condition) is met. With one or more types of device operational state information, control circuitry 20 (e.g., executing management process 48) may use a fault detection (sub-) process that incorporates historical or temporal device operational state information into the determination of whether the criterion is met. As an example, the historical device operational state information may be provide temporal information on when one or more control plane processes 26 and/or a software forwarding process 28 crashed (e.g., went down) and/or whether one or more control plane processes 26 and/or a software forwarding process 28 restarted greater than a threshold number of times across a given time period. If desired, a rolling or sliding time window may be used to obtain a rolling average (across the sliding time window) of (historical) metric values indicative of device operational state information for comparison with a threshold. This may help to smooth out state changes of relay 36 and bypass path 16 (e.g., avoid rapid switching between enabled and disabled states of relay 36).

These examples are merely illustrative. If desired, any other types of (fault) determination process using any suitable heuristic may be employed to determine whether criteria for enabling and disabling bypass path 16 is met. If desired, user input (e.g., configuration files) and/or user-configured thresholds or other fault determination parameters may be used to make a determination of whether or not one or more criteria for enabling and/or disabling bypass path 16 is met.

When control circuitry 20 makes a determination that a criterion for enabling bypass path 16 is met, control circuitry 20 may control (e.g., by sending one or more control signals or other control data) to cause controller 24 to output one or more control signals to enable bypass path 16 (e.g., output a control signal to switch relay 36 to enabled state 44-2). When control circuitry 20 makes a determination that a criterion for disabling bypass path 16 is met, control circuitry 20 may control (e.g., by sending one or more control signals or other control data) to cause controller 24 to output one or more control signals to disable bypass path 16 (e.g., output a control signal to switch relay 36 to disabled state 44-1).

While network device 10 is shown and sometimes described in the examples of FIGS. 1-3 as including a single relay 36 on a single bypass path 16 coupled to a single fail-to-wire interface 12-2, this is merely illustrative. If desired, network device 10 may include multiple (fail-to-wire) relays each coupled along a corresponding (fail-to-wire) bypass path between a corresponding (WAN or another type) interface and a corresponding fail-to-wire interface. Each of the fail-to-wire interfaces may be coupled to a corresponding complementary interface on peer network device 10' (analogous to interface 12-2' for interface 12-2 in FIG. 1).

Figure 5:
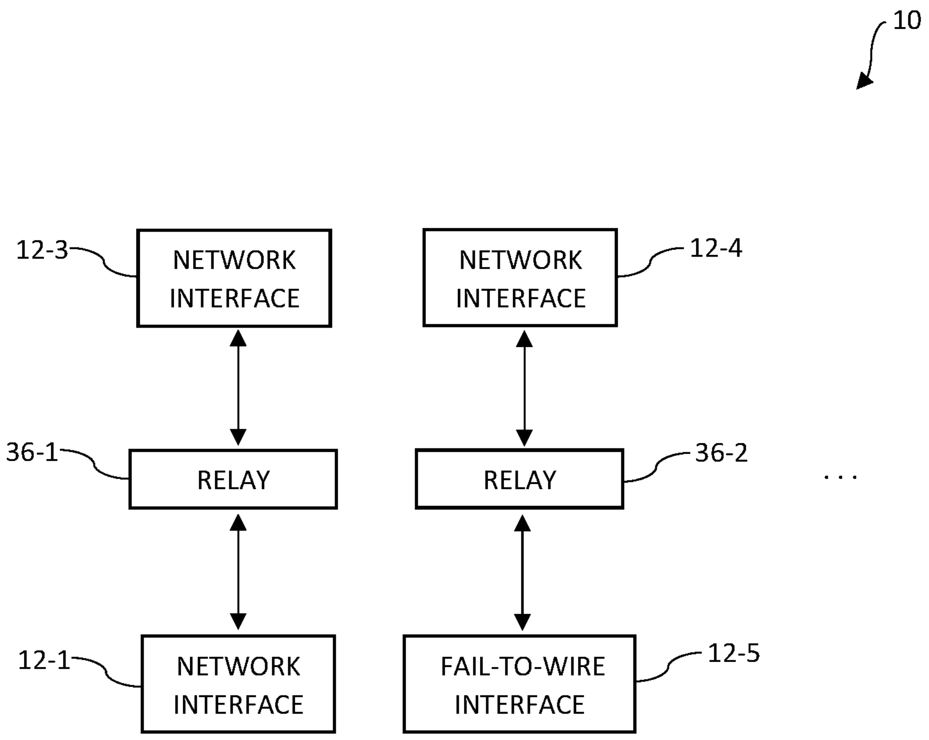
FIG. 5 is a diagram of an illustrative network device with multiple illustrative fail-to-wire bypass paths in accordance with some embodiments.

As shown in the example of FIG. 5, network device 10 may include a plurality of relays 36 such as relays 36-1 and 36-2. In a similar configuration as described in connection with FIG. 3, each relay 36 may selectively couple a corresponding (WAN) interface to physical layer circuitry 34 (and one or more local data processing paths 14 therethrough) or to a corresponding (fail-to-wire) interface depending on whether that relay 36 and its corresponding bypass path is disabled or enabled. In the example of FIG. 5, relay 36-1 may be relay 36 in FIGS. 1-3 coupling (WAN) interface 12-3 to LAN interface 12-1 (e.g., through physical layer circuitry 34 and data plane processing path 14) in the disabled state as shown in FIG. 5 (or coupling WAN interface 12-3 to fail-to-wire interface 12-2 in the enabled state in which the bypass path is enabled). Relay 36-2 may be another relay coupling (WAN) interface 12-4 to another (fail-to-wire) interface 12-5 of device 10 in the enabled state as shown in FIG. 5 (or coupling WAN interface 12-4 to a LAN interface through physical layer circuitry 34 and data plane processing path 14 in the disabled state in which the bypass path is disabled). WAN interface 12-4 may be coupled to the same service provider network 8B as or a different service provider network 8B than interface 12-3.

Controller 46 may control each of relays 36 and more generally each of the bypass paths on which the relays 36 are coupled independently based on the device operational state information and the (fault) determination process as described in connection with FIG. 4.

As one illustrative example, in response to determining that one or more device operating metrics such as processor utilization 68 and/or memory utilization 70 associated with software forwarding process 28 (FIG. 2) meet a first criterion but not a second criterion (e.g., is greater than a first threshold but less than a second (fault) threshold), control circuitry 20 may control relay 36-1 and the corresponding bypass path to operate in the disabled state to enable local data plane processing for traffic received on interface 12-3 and may control relay 36-2 and the corresponding bypass path operate in the enabled state, thereby enabling peer device data plane processing at peer network device 10'. In such a manner, device 10 may still perform some local data plane processing (because at least bypass path corresponding to relay 36-1 is disabled and this corresponding communication link to peer network device 10' is down), while peer network device 10' may perform the remaining data plane processing remotely (because the bypass path corresponding to relay 36-2 is enabled and this corresponding communication link to peer network device 10' is up).

This is merely illustrative. If desired, one, two, three, or any suitable number of relays and corresponding bypass paths may be enabled (while one, two, three, or any suitable number of relays and corresponding bypass paths are disabled) based on one or more criteria associated with device operating (metric) information being met and/or one or more criteria associated with device operating (metric) information being met.

If desired, in response to determining that one or more device operating metrics such as processor utilization 68 and/or memory utilization 70 associated with software forwarding process 28 (FIG. 2) meet the first and second criteria (e.g., is greater than the first threshold and is greater than the second (fault) threshold), control circuitry 20 may control, using controller 46, both (e.g., all) relays 36 to operate in an enabled state, thereby enabling both (e.g., all) of the (fail-to-wire) bypass paths.

The use of processor utilization and memory utilization as one or more criteria for making a determination to enable a subset of (fail-to-wire) bypass paths is merely illustrative. In general, any device operating information (e.g., those as described in connection with FIG. 4) may similarly be used to make determinations on whether various criteria are met to enable a subset of bypass paths, or if desired different subsets of bypass paths (in configurations in which more than two bypass paths are provided), to enable all of the bypass paths, or to disable all of the bypass paths.

Unlike when fail-to-wire is performed only when network device 10 is entirely non-operational (e.g., is powered down due to an unexpected fault or intentionally), when network device 10 is configured in the manner described in connection with FIGS. 1-5, portions of network device 10 (e.g., packet processors 30, one or more processes executing on control circuitry 20, etc.) may still be operational. Accordingly, network device 10 may perform some operations even while relay 36 (FIGS. 1-3) and any other relay 36 are enabled to activate bypass paths facilitating fail-to-wire bypass to peer network device 10'.

Figure 6:
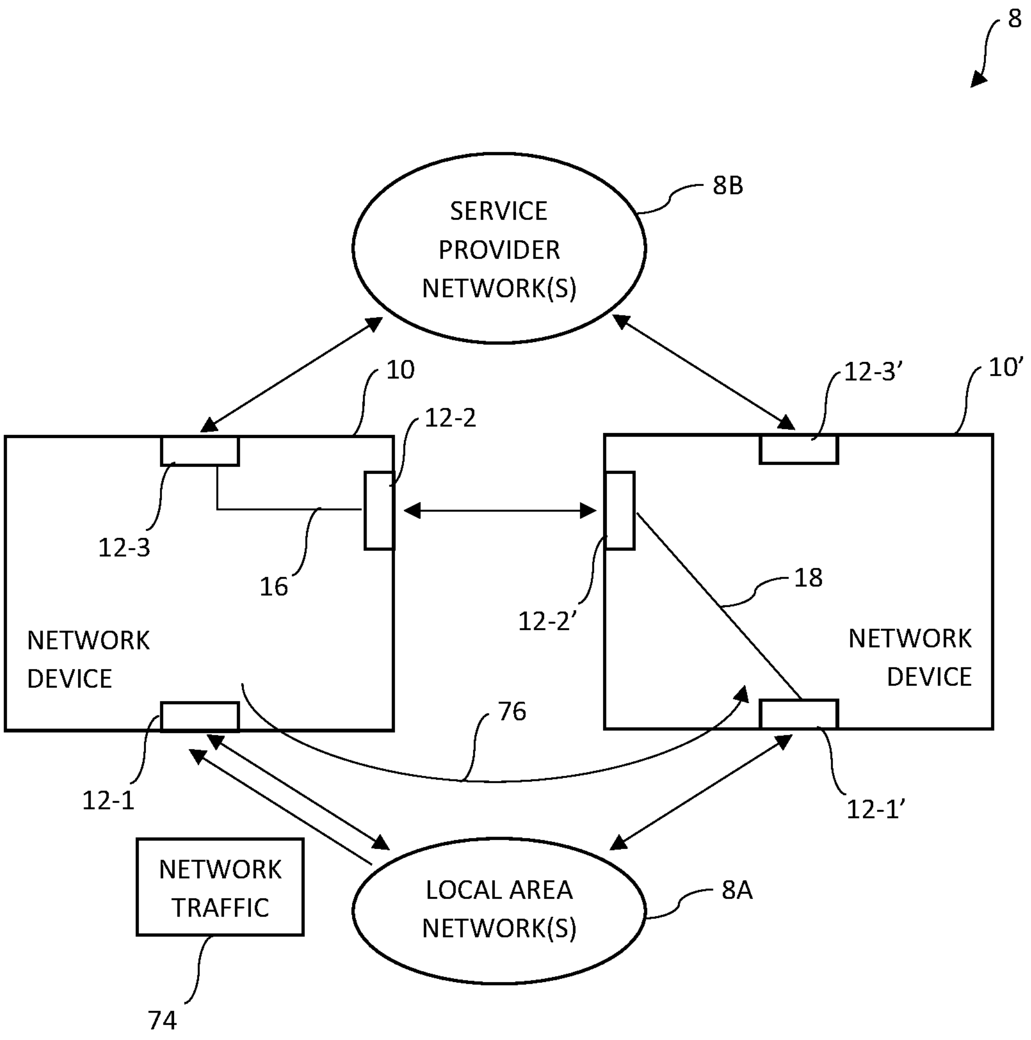
FIG. 6 is a diagram of an illustrative network device configured to forward local traffic while a fail-to-wire bypass path is active in accordance with some embodiments.

As shown in the example of FIG. 6, path 16, the communication link between interfaces 12-2 and 12-2', and peer device data plane processing path(s) 18 may be used to facilitate handling of traffic conveyed across interfaces 12-3 (e.g., based on the determination process described in connection with FIGS. 3 and 4 causing this bypass path to be enabled). While traffic conveyed across interface 12-3 is handled in this manner, network device 10 may still forward (local) traffic received at (LAN) interface 12-1 such as traffic 74. In particular, packet processor 30 may forward traffic 74 (e.g., after encapsulating traffic 74 with tunneling headers) using interface 12-1 or another (LAN) interface to network device 10' as indicated by arrow 76. Network device 10 performing this type of operation (e.g., forwarding of traffic 74), while the fail-to-wire bypass is used for traffic on interface 12-3, is merely illustrative. Numerous other operations (e.g., performed by hardware components and/or processes executing on control circuitry 20 that are unaffected or minimally affected by fault, or generally in an acceptable operational state) may also be performed concurrently when the fail-to-wire bypass is activated.

Figure 7:
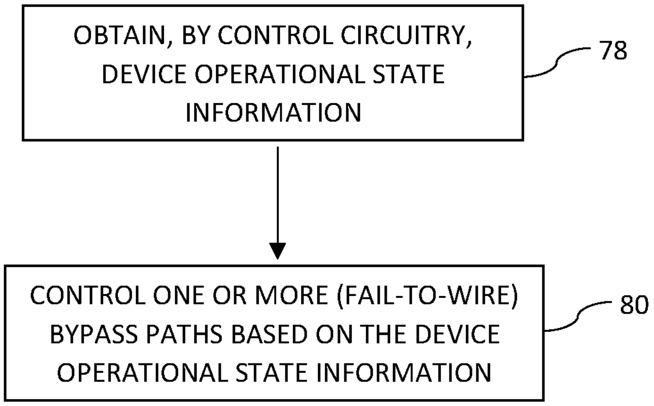
FIG. 7 is a flowchart of illustrative operations for using one or more fail-to-wire bypass paths in accordance with some embodiments.

FIG. 7 is a flowchart of illustrative operations for using fail-to-wire functionality to enhance general device operation. In configurations described herein as an illustrative example, the operations described in connection with FIG. 7 may be performed by control circuitry 20 in network device 10 (e.g., performed by processing circuitry 22 in network device 10 by executing software instructions stored on memory circuitry 24 in FIG. 2), e.g., using interface circuitry 32 such as one or more relays 36 as described in connection with FIGS. 1-6. If desired, one or more operations described in connection with FIG. 7 may be performed using other hardware components in network device 10 (e.g., a hardware controller 46, when implemented separately from control circuitry 20).

At block 78, control circuitry of a network device (e.g., processing circuitry 22 when executing software associated with management process 48 stored on memory circuitry 24) may obtain device operational state information. The device operational state information may generally include any information indicative of the state of operation of any hardware component in the network device and/or the state of operation of any software process executing on the control circuitry of the network device. As described in connection with FIG. 4, the device operational state information may include, as just a few examples, information indicative of the operating state of a software forwarding process such as process 28 (FIG. 2), information indicative of the operating state of one or more control plane processes such as processes 26 (FIG. 2), information indicative of the operating (e.g., utilization) state of the hardware components such as processors (e.g., processing circuitry 22 and/or 30 in FIG. 2) and memory (e.g., memory circuitry 24 and/or memory circuitry associated processor 30 in FIG. 2) based on which the software processes are executed, and information indicative of the operating (fault) state of hardware components or systems such as a cryptographic engine, memory error checking circuitry, a thermal management system, a power management system, and/or other components of device 10.

At block 80, the control circuitry (e.g., processing circuitry 22 when executing software associated with management process 48 stored on memory circuitry 24) may control one or more (fail-to-wire) bypass paths (e.g., enable one or more bypass paths) based on the device operational state information obtained at block 78. As an example, the control circuitry may compare the obtained device operational state information to corresponding thresholds to determine whether criteria associated enabling a subset of bypass paths, criteria associated enabling all of the bypass paths, criteria associated disabling a subset of bypass paths, or criteria associated disabling all of the bypass paths are met. Based on the one or more criteria being met, the control circuitry may take appropriate actions such as to enable a subset of bypass paths, enable all of the bypass paths, disable a subset of bypass paths, or disable all of the bypass paths. In illustrative configurations described herein, this may be done by the control circuitry outputting control signal(s) or other control data to a relay controller that in turn provides corresponding control signals to the relay on each of the corresponding bypass paths to switch them into the appropriate (enabled or disabled) state.

The methods and operations described above in connection with FIGS. 1-7 may be performed by the components of a network device using software, firmware, and/or hardware (e.g., dedicated circuitry or hardware). Software code for performing these operations may be stored on one or more non-transitory computer readable storage media (e.g., tangible computer readable storage media) stored on one or more of the components of the network device. The software code may sometimes be referred to as software, data, instructions, program instructions, or code. The one or more non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device (e.g., control plane processing circuitry 32 in FIG. 2, interface circuitry 38 of FIG. 2, etc.).

The foregoing is merely illustrative and various modifications can be made to the described embodiments. The foregoing embodiments may be implemented individually or in any combination.

What is claimed is:

1. A network device operable with a peer device, the network device comprising:
- a network interface;
- physical layer circuitry;
- a fail-to-wire interface;
- a fail-to-wire bypass path coupled between the network interface and the fail-to-wire interface, wherein the fail-to-wire interface is configured to convey traffic to and from the peer device when the fail-to-wire bypass path is enabled;
- a relay coupled between the network interface and the physical layer circuitry and coupled between the network interface and the fail-to-wire interface, wherein the relay, when in a disabled state, connects the network interface to the physical layer circuitry, wherein the relay, when in an enabled state, connects the network interface to the fail-to-wire interface, and wherein the relay is in the enabled state to enable the fail-to-wire bypass path; and
- control circuitry coupled to the fail-to-wire bypass path and configured to:
  - obtain device operational state information; and
  - control a state of the fail-to-wire bypass path by controlling a state of the relay based on the device operational state information.

2. The network device defined in claim 1, wherein the control circuitry is configured to:
- determine whether a criterion to enable the fail-to-wire bypass path is met based on the device operational state information; and
- place the relay in the enabled state in response to the criterion being met.

3. The network device defined in claim 2, wherein the device operational state information is indicative of a state of a software forwarding process executing on the control circuitry and wherein the criterion is met based on the state of the software forwarding process.

4. The network device defined in claim 2, wherein the device operational state information is indicative of a state of a control plane process executing on the control circuitry and wherein the criterion is met based on the state of the control plane process.

5. The network device defined in claim 2, wherein the device operational state information is indicative of a state of processor utilization or a state of memory utilization and wherein the criterion is met based on the state of processor utilization or the state of memory utilization.

6. The network device defined in claim 2, wherein the device operational state information is indicative of a fault in a hardware component of the network device and wherein the criterion is met based on the fault in the hardware component.

7. The network device defined in claim 2, wherein the control circuitry is configured to:
- determine whether an additional criterion to disable the fail-to-wire bypass path is met based on the device operational state information; and
- place the relay in the disabled state in response to the additional criterion being met.

8. The network device defined in claim 1 further comprising:
- a relay controller, wherein the control circuitry is configured to control the state of the relay by causing the relay controller to provide a control signal to the relay based on the device operational state information.

9. The network device defined in claim 8, wherein the relay controller comprises a software driver executing on the control circuitry or a controller separate from the control circuitry.

10. The network device defined in claim 1 further comprising:

a local area network interface, wherein the network interface is a wide area network interface coupled to the local area network interface by a data plane processing path that includes a software forwarding process executing on the control circuitry.

11. The network device defined in claim 10, wherein the wide area network interface is decoupled from the data plane processing path when the control circuitry enables the fail-to-wire bypass path based on the device operational state information.

12. The network device defined in claim 10 further comprising:

data plane processing circuitry configured to process local traffic received at the local area network interface when the fail-to-wire bypass path is enabled.

13. The network device defined in claim 1 further comprising:

an additional network interface;

an additional fail-to-wire interface; and an additional fail-to-wire bypass path coupled between the additional network interface and the additional fail-to-wire interface, wherein the additional fail-to-wire interface is configured to convey traffic to and from the peer device when the additional fail-to-wire bypass path is enabled and wherein the control circuitry is configured to enable the fail-to-wire bypass path based on the device operational state information while disabling the additional fail-to-wire bypass path.

14. A network device operable with a peer device, the network device comprising:

a first fail-to-wire interface;

a first relay coupled to the first fail-to-wire interface, wherein the first fail-to-wire interface is configured to convey traffic to and from the peer device when the first relay is enabled;

a second fail-to-wire interface;

a second relay coupled to the second fail-to-wire interface, wherein the second fail-to-wire interface is configured to convey traffic to and from the peer device when the second relay is enabled; and control circuitry coupled to the first and second relays and configured to enable the first relay while disabling the second relay.

15. The network device defined in claim 14, wherein the control circuitry is configured to obtain device operating information and wherein the control circuitry is configured to enable the first relay while disabling the second relay based on the device operating information.

16. The network device defined in claim 15, wherein the control circuitry is configured to obtain an operating metric associated with the device operating information and wherein the control circuitry is configured to enable the first relay while disabling the second relay in response to a first criterion based on the operating metric being met and a second criterion based on the operating metric being not met.

17. The network device defined in claim 16, wherein the control circuitry is configured to enable the first relay and the second relay in response to the first and second criteria being met.

18. The network device defined in claim 14 further comprising:

a first network interface coupled to the first relay, wherein the first relay being enabled facilitates remote data plane processing at the peer device for traffic received via the first network interface; and a second network interface coupled to the second relay, wherein the second relay being disabled facilitates local data plane processing at the network device for traffic received via the second network interface.

19. A network device operable with a peer device, the network device comprising:

a local area network interface;

a wide area network interface;

a fail-to-wire interface;

a relay coupled between the wide area network interface and the fail-to-wire interface, wherein the fail-to-wire interface is configured to convey traffic to and from the peer device when the relay is enabled;

control circuitry coupled to the relay and configured to enable the relay to activate a bypass path between the wide area network interface and the fail-to-wire interface; and data plane processing circuitry configured to forward network traffic received at the local area network interface while the relay is enabled and the bypass path is activated.

20. The network device defined in claim 19, wherein the bypass path bypasses a data plane processing path implemented using the control circuitry or the data plane processing circuitry.

* * * * *